Figures 1, 2:
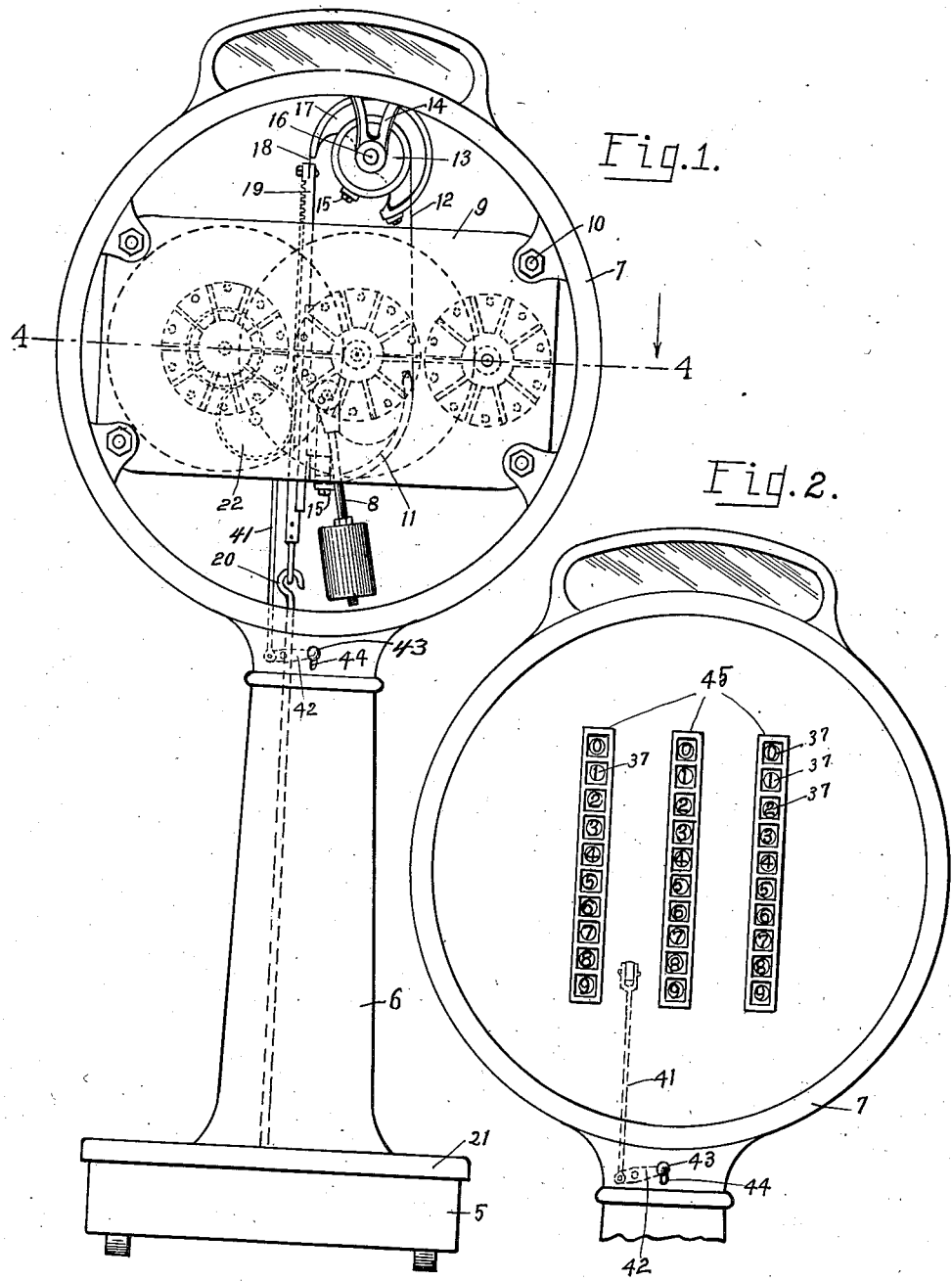

Feb. 27, 1923.

H. F. DUNN.
WEIGHING SCALE.
FILED MAY 10, 1916.

1,446,552.

3 SHEETS—SHEET 1.

WITNESSES
D. C. Walter
C. Zinke

INVENTOR
Henry F Dunn
By George R. Frye
ATTORNEY

Feb. 27, 1923.
H. F. DUNN.
WEIGHING SCALE.
FILED MAY 10, 1916.
1,446,552.
3 SHEETS—SHEET 2.
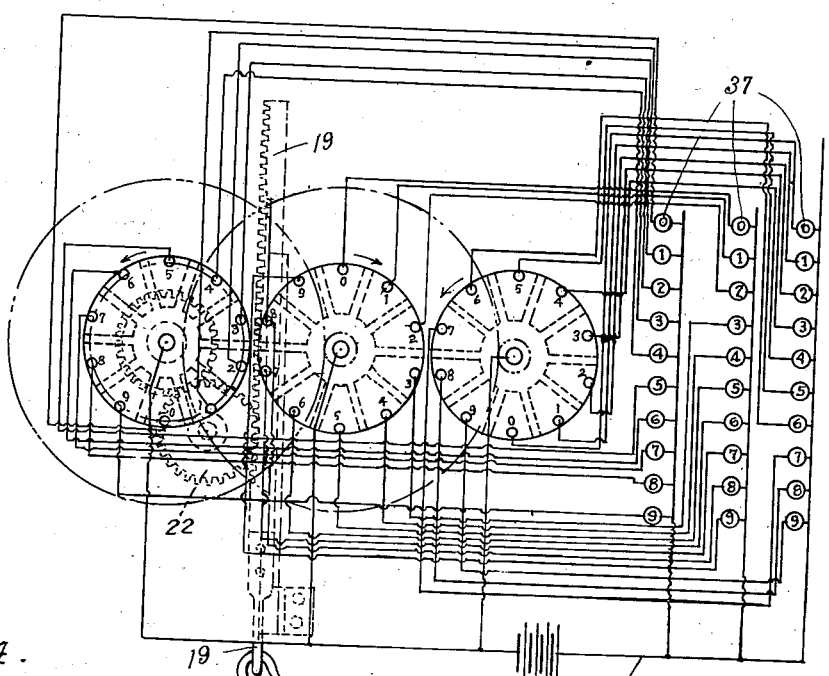
Fig. 3.
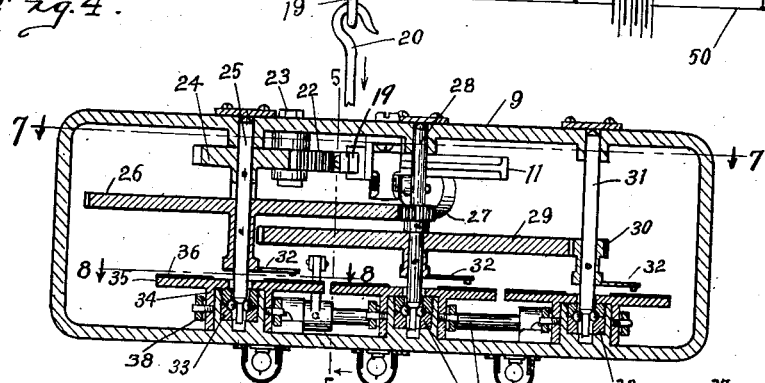
Fig. 4.
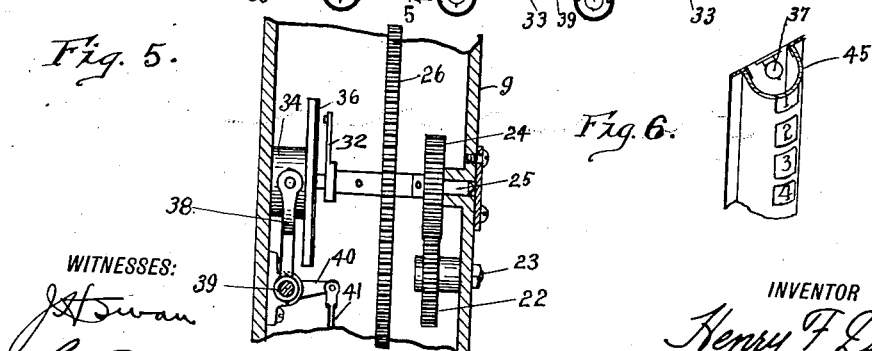
Fig. 5.
Fig. 6.
WITNESSES:
INVENTOR
Henry F Dunn
BY
George R Frye
ATTORNEY Feb. 27, 1923.
H. F. DUNN.
WEIGHING SCALE.
FILED MAY 10, 1916.
1,446,552.
3 SHEETS—SHEET 3.
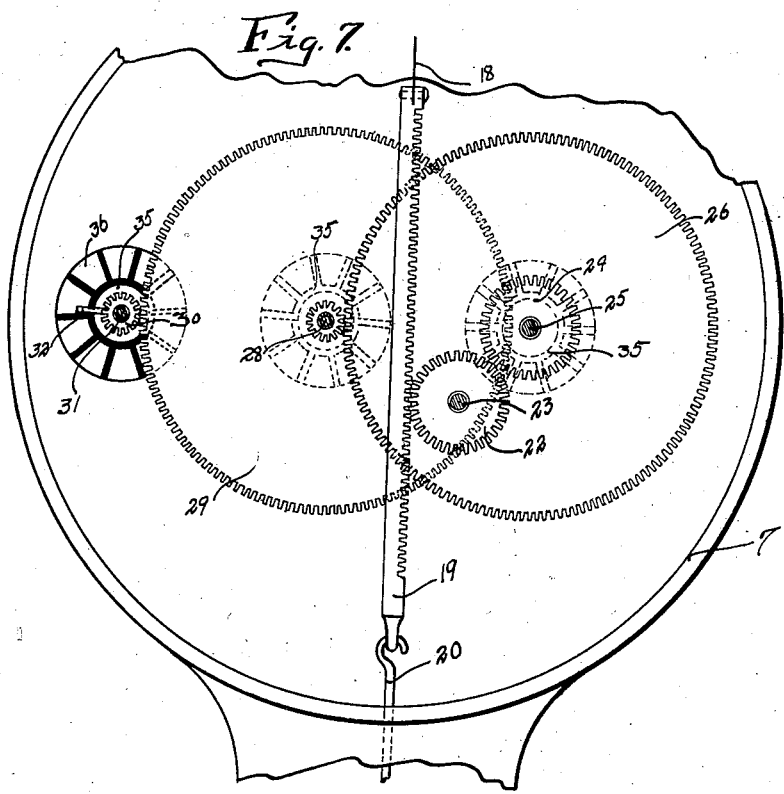
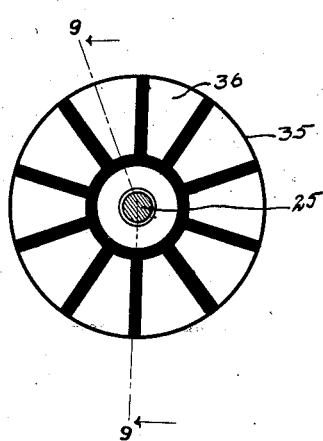
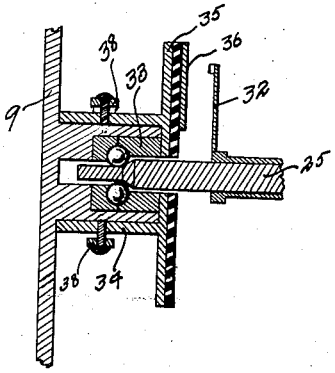
Witnesses.
C. E. Wilcox
Frances C. Doyle
Inventor
Henry F. Dunn.
By George R. Frye
Attorney Patented Feb. 27, 1923.

1,446,552

UNITED STATES PATENT OFFICE.

HENRY F. DUNN, OF ANDERSON, INDIANA, ASSIGNOR TO TOLEDO SCALE COMPANY, OF TOLEDO, OHIO, A CORPORATION OF NEW JERSEY.

WEIGHING SCALE.

Application filed May 10, 1916. Serial No. 96,510.

*To all whom it may concern:*

Be it known that I, HENRY F. DUNN, a citizen of the United States, residing at Anderson, in the county of Madison and State of Indiana, have invented certain new and useful Improvements in Weighing Scales, of which the following is a specification.

My invention relates to weighing scales, and more particularly to automatic scales for weighing persons and commodities.

The primary object of my invention is to provide an automatic scale having a novel and attractive form of indicating mechanism denoting the weight of a load placed upon the scale platform in large, clear, illuminated figures.

A further object is to provide an electrically-actuated indicating means for weighing scales co-operating with a positively-actuated weighing mechanism.

Another object is to so construct and arrange the weighing mechanism of the scale with respect to the electrically-actuated indicating mechanism that the weighing mechanism may complete its full operation without affecting the indicating mechanism, and the indicating mechanism can then be brought into operation by any desired means, as, for example, by manually moving a lever, or by coin-operated mechanism.

Other objects and advantages will appear from the following description, in which reference is had to the accompanying drawings illustrating a preferred embodiment of my invention, and in which similar reference numerals designate similar parts throughout the several views.

In the drawings:—

Fig. 1 is a front elevation of a weighing scale embodying my invention, with the front plate or dial removed; Fig. 2 is an elevation of the upper portion of the scale mechanism, with the front plate in normal position; Fig. 3 is a diagrammatic view of the wiring mechanism preferably utilized; Fig. 4 is a transverse section taken substantially on the line 4—4 of Fig. 1; Fig. 5 is a detail vertical section taken substantially on the line 5—5 of Fig. 4; and Fig. 6 is a detail perspective view of a portion of the indicating mechanism; Figures 7 and 8 are detail vertical sections taken substantially on the lines 7—7 and 8—8 of Figure 4; and Figure 9 is a detail cross section taken substantially on the line 9—9 of Figure 8.

Referring to the drawings, 5 designates the hollow base supporting at one end a column 6 upon which is mounted a casing 7 in which is suitably mounted, the weighing mechanism and indicating mechanism of my improved scale. The weighing mechanism comprises a pendulum 8 pivotally mounted in bearings carried by brackets formed on the framework 9 which is suitably secured within the casing 7, as by the transverse bolts 10 (see Fig. 1). The segment 11 of the pendulum is connected by the flexible metallic strap or band 12 with the drum 13 suitably mounted in brackets 14 adjacent the upper portion of the casing, the band 12 passing around the curved faces of the segment and drum respectively and being suitably secured as by retaining screws 15. A larger segment 17 is fixed upon the same shaft 16 which carries the drum 13, and the flexible strap 18 is secured at one extremity to the segment 17, passes over the arcuate face thereof, and is secured at its opposite end to the rack 19, the lower extremity of which is connected with the steelyard rod 20, as clearly shown in Fig. 1.

The hollow base 5 is adapted to contain a leverage system (not shown) upon which is supported a platform or goods-receiver 21, and the leverage system is suitably connected with the lower end of the steelyard rod 20 as is usual in scales of this character. It is to be understood that any suitable platform and platform lever mechanism may be employed in connection with my improved weighing mechanism, the weighing mechanism herein shown being designed to satisfactorily operate when employed in various kinds of scales, as, for example, in portable, dormant or hanging scales.

The rack 19 meshes with a pinion 22 mounted upon a stub shaft 23 carried by the framework 9 (see Fig. 4), the pinion 22 meshing with the pinion 24 fixed on the transverse shaft 25 which also carries the gear 26. The gear 26 meshes in turn with a pinion 27 fixed on the shaft 28 carrying the gear 29 meshing with the pinion 30 fixed on the shaft 31. The number of teeth on the pinions 27 and 30 with relation to the number of teeth on the gears 26 and 29 is preferably in the proportion of 1:10, so that the rotation of the gear 26 will multiply tenfold the rotations of the pinion 27 and gear 29, which gear will in turn multiply tenfold the rotations of the pinion 30. While this is the preferable multiplication, it is to be understood that any other desired multiplication may be used, for example, if it is desired to show ounces of weight, the proportion of the pinion secured to the ounce indicating shaft with reference to the gear meshing therewith would be as 1:16. Suitable contact arms 32 are fixed upon the arbors of the gears 26 and 29 and the pinion 30, said arms carrying light spring contacts adjacent their free ends, and being suitably connected by electric wires to the feed line 50 of a lighting circuit. Slidably mounted upon bosses 33 upon the framework 9 are sleeves 34 carrying at their rear extremities suitable disks 35 upon which are mounted a plurality of insulated segments 36, as clearly shown in Figs. 8 and 9. Each of the insulated segments is connected by suitable wiring with one pole of an electric lamp 37, the other pole of which is connected with the feed wire of the lighting circuit, as shown in Fig. 3. These lamps are arranged in rows adjacent the front plate of the scale and all of the segments on one disk 35 are connected with the lamps in one row. Means are to be provided to project the sleeves 34 carrying the segments 36 into engagement with the contact arms 32 whenever it is desired to indicate weights. Various means may be used for this purpose, and may be actuated manually, from coin-controlled mechanism or otherwise, as desired. In the embodiment herein shown for illustrative purposes, the sleeves 34 are connected by yokes 38 with the shaft 39 mounted on the forward portion of the framework 9 below the bosses 33, as shown in Fig. 5, a crank arm 40 on said shaft 39 being connected, as by the link 41, with a lever 42 mounted on the casing 7 adjacent the upper extremity of the column 6. A knob 43 or other suitable means for rocking the lever 42 projects through a slot 44 formed in the casing 7. The force which moves the indicating mechanism of the scale rapidly diminishes as the scale approaches balanced position, the force available for moving the indicator over the graduations adjacent those indicating the true weight being infinitesimal. It is imperative, therefore, for accurate weighing that the operation of the indicating mechanism be substantially frictionless. If the contact members 32 and 36 were in engagement during movement of the indicating mechanism, the friction between these members would cause the scale to "stick" and thereby prevent accurate weighing.

The rows of lamps 37 are preferably arranged in parallel relation, substantially as shown in Fig. 2, and are covered by elongated translucent members 45 each bearing opaque indications of numerals serially arranged from zero to nine, one of said numerals being directly in front of each of the lamps 37. The reverse of this arrangement could, of course, be used with the numbers translucent on an opaque support.

In the operation of the scale, a load placed upon the platform 21 will exert a downward pull upon the rack 19 lifting the pendulum 8 to a position offsetting the weight of the load and simultaneously rotating the pinion 22 to set in motion the train of gears 26, 29 and 30 whereby the contact arms 32 are rotated in accordance with the amount of displacement given to the pinion 22 from the rack 19. It will be understood that the rotation of the pinion 22 will be multiplied in accordance with the proportional number of teeth in the train of gears and pinions carrying the contact arms 32 so that the said contact arms will be rotated through different angular distances to various angular positions, according to the weight of the load on the platform 21. The contact arms 32 having thus been set by the movement of the rack 19, the knob 43 is grasped and the lever 42 rocked to rotate the shaft 39 and slide the sleeve 34 with their disks 35 into engagement with the light spring contacts of the contact arms 32. The lighting circuit will be completed through the particular insulated segments 36 then engaging the contact arms 32 and the particular lamps 37 electrically connected with these segments, so that in the embodiment illustrated, one lamp in each of the parallel rows will be lighted to indicate the weight of the load being weighed. Thus, if a load weighing 345 lbs. were placed upon the platform of the scale, the movement of the rack 19 and pinion 22 would actuate the train of gears 26, 29 and 30 so as to move the contacts 32 into such position that when the disks 35 were moved into engagement therewith, those insulated segments 36 on the disks connected respectively with the lamps directly behind the numeral 3 on the left hand row of the lamps, the numeral 4 in the next row of lamps, and the numeral 5 in the third row of lamps, as shown in Fig. 2, will engage the contacts 32, completing the circuits so that these lamps will be illuminated. From the rows of numerals, therefore, only the numerals 3 in the left hand row, 4 in the second row, and 5 in the third row will be illuminated, and the weight of the load being weighed will be clearly shown and will be visible for a considerable distance despite the fact that the scale be used in a dark room or warehouse, a mine shaft, etc.

While it will be apparent that the illustrated embodiment of my invention herein disclosed is well adapted to adequately fulfill the objects of the invention primarily stated, it is to be understood that many other forms and structures may be employed, this invention being susceptible to modification, variation and change without departing from the spirit and scope of the subjoined claims.

Having described my invention, I claim:

1. In a scale and in combination with the weighing mechanism thereof, indicating mechanism including an illuminating device and normally disengaged contact means having an element mechanically connected to said weighing mechanism said contact means being electrically connected to said illuminating device, and means for bringing said contact means into engagement to actuate said illuminating device.

2. In a scale and in combination with the weighing mechanism thereof, indicating mechanism including contact means mechanically connected to said weighing mechanism, other contact means, means for moving certain of the second said contact means into engagement with the first said contact means, and an illuminating circuit arranged to be closed by such engagement.

3. In a scale, in combination, weighing mechanism, and indicating mechanism including a selective device operatively connected to the weighing mechanism, contact means movable into contact with said selective device, and an electric indicator in circuit with said selective device and said contact means.

4. In a scale, in combination, weighing mechanism, and indicating means including a selective device actuated by the weighing mechanism and movable to various angular positions, contact means normally separated from the selective device and movable into contact therewith, and an electric indicator in circuit with said selective device and said contact means.

5. In a scale, in combination, pendulum weighing mechanism, and indicating mechanism including a selective device actuated by the weighing mechanism and movable to various angular positions, contact means normally separated from the selective device and movable into contact therewith, operating means for moving said contact means, and electrically-actuated indicating means for exhibiting the indications in circuit with said selective device and said contact means.

6. In a scale, in combination, weighing mechanism, and indicating mechanism including a selective device actuated by the weighing mechanism and including a train of gears respectively carrying rotative contacts, contact means normally separated from the selective device and movable into contact therewith, and an electric indicator in circuit with said selective device and said contact means.

7. In a scale, weighing mechanism, indicating mechanism including a selective mechanism actuated by the weighing mechanism and including a train of gears respectively carrying rotative contacts, and indicating means for exhibiting the weight indications including a plurality of insulated contact plates movable into contact with the rotative contacts of the selective mechanism.

8. In a scale, weighing mechanism, indicating mechanism including a selective mechanism actuated by the weighing mechanism and including a train of gears respectively carrying rotative contacts, and indicating means for exhibiting the weight indications comprising a plurality of disks having spaced insulated segments thereon movable into engagement with the rotating contacts of the selective mechanism.

9. In a scale, weighing mechanism, indicating mechanism including a selective mechanism actuated by the weighing mechanism including a train of gears respectively carrying rotative contacts, and indicating means for exhibiting the weight indications comprising a plurality of disks having spaced insulated segments thereon movable into engagement with the rotating contacts of the selective mechanism, and series of illuminating lamps respectively electrically connected with said segments.

10. In a scale, and in combination with the weighing mechanism thereof, indicating means including a selective mechanism actuated by the weighing mechanism, series of illuminating lamps arranged in view of the operator, and a plurality of spaced contact plates respectively connected with said lamps and slidable into contact with said selective mechanism.

11. In a scale and in combination with the weighing mechanism thereof, indicating mechanism including contact means mechanically connected to said weighing mechanism, other contact means normally disengaged from the first said contact means, a series of electric lamps controlled by said contact means, and coverings for said lamps having numerals marked thereon and each arranged to be individually illuminated when the lamp immediately behind the same is lighted.

12. In a scale and in combination with the weighing mechanism thereof, a train of gears arranged to be rotated from the weighing mechanism and carrying a plurality of rotative contacts, a plurality of discs carrying insulated segments arranged to be moved into engagement with said rotative contacts when desired, and indicating mechanism arranged to be illuminated when said discs and rotative contacts are in engagement.

13. In a scale and in combination with the weighing mechanism thereof, a train of gears arranged to be rotated from the weighing mechanism and carrying a plurality of rotative contacts, a plurality of discs carrying insulated segments mounted for slidable movement into engagement with said rotative contacts when desired, and indicating mechanism arranged to be illuminated when said discs and rotative contacts are in engagement.

HENRY F. DUNN.

Witnesses:
  ANNA S. LOUISE,
  MARGARET DUNN.